United States Patent [19]

Gunter et al.

[11] 4,348,722
[45] Sep. 7, 1982

[54] BUS ERROR RECOGNITION FOR MICROPROGRAMMED DATA PROCESSOR

[75] Inventors: Thomas G. Gunter; Lester M. Crudele; John E. Zolnowsky; David S. Mothersole, all of Austin, Tex.

[73] Assignee: Motorola, Inc., Schaumburg, Ill.

[21] Appl. No.: 136,845

[22] Filed: Apr. 3, 1980

[51] Int. Cl.³ .................. G06F 11/00; H04L 1/00
[52] U.S. Cl. .................................... 364/200; 371/32
[58] Field of Search ............................. 371/32, 12; 364/200 MS File, 900 MS File

[56] References Cited

U.S. PATENT DOCUMENTS

| | | | |
|---|---|---|---|
| 3,340,505 | 9/1967 | Scott | 371/32 |
| 3,452,330 | 6/1969 | Avery | 371/32 |
| 3,460,090 | 8/1969 | Eriksson | 371/12 |
| 3,736,566 | 5/1973 | Anderson et al. | 364/200 |
| 3,824,547 | 7/1974 | Green et al. | 371/32 |
| 3,932,841 | 1/1976 | Deerfield et al. | 371/32 |
| 4,044,337 | 8/1977 | Hicks et al. | 364/200 |
| 4,045,661 | 8/1977 | Antoine et al. | 371/12 |
| 4,174,536 | 11/1979 | Misunas et al. | 364/200 |

OTHER PUBLICATIONS

Birney and Nielsen, "Save Storage Address on Error Class Interrupts", IBM Tech. Discl. Bull., vol. 19, No. 11, Apr. 77, pp. 4062-4068.

Primary Examiner—Gareth B. Shaw
Assistant Examiner—Eddie P. Chan
Attorney, Agent, or Firm—Anthony J. Sarli, Jr.; Vincent Ingrassia; Jeffrey Van Myers

[57] ABSTRACT

An integrated circuit microprocessor includes storage means coupled to a control unit for receiving from the control unit information regarding how the next bus cycle is to be run. Upon receipt of a bus error signal from a peripheral device, the storage means is reset. If, however, a halt signal accompanies the bus error signal, the storage means is not reset and the bus cycle is rerun when the halt signal terminates.

4 Claims, 10 Drawing Figures

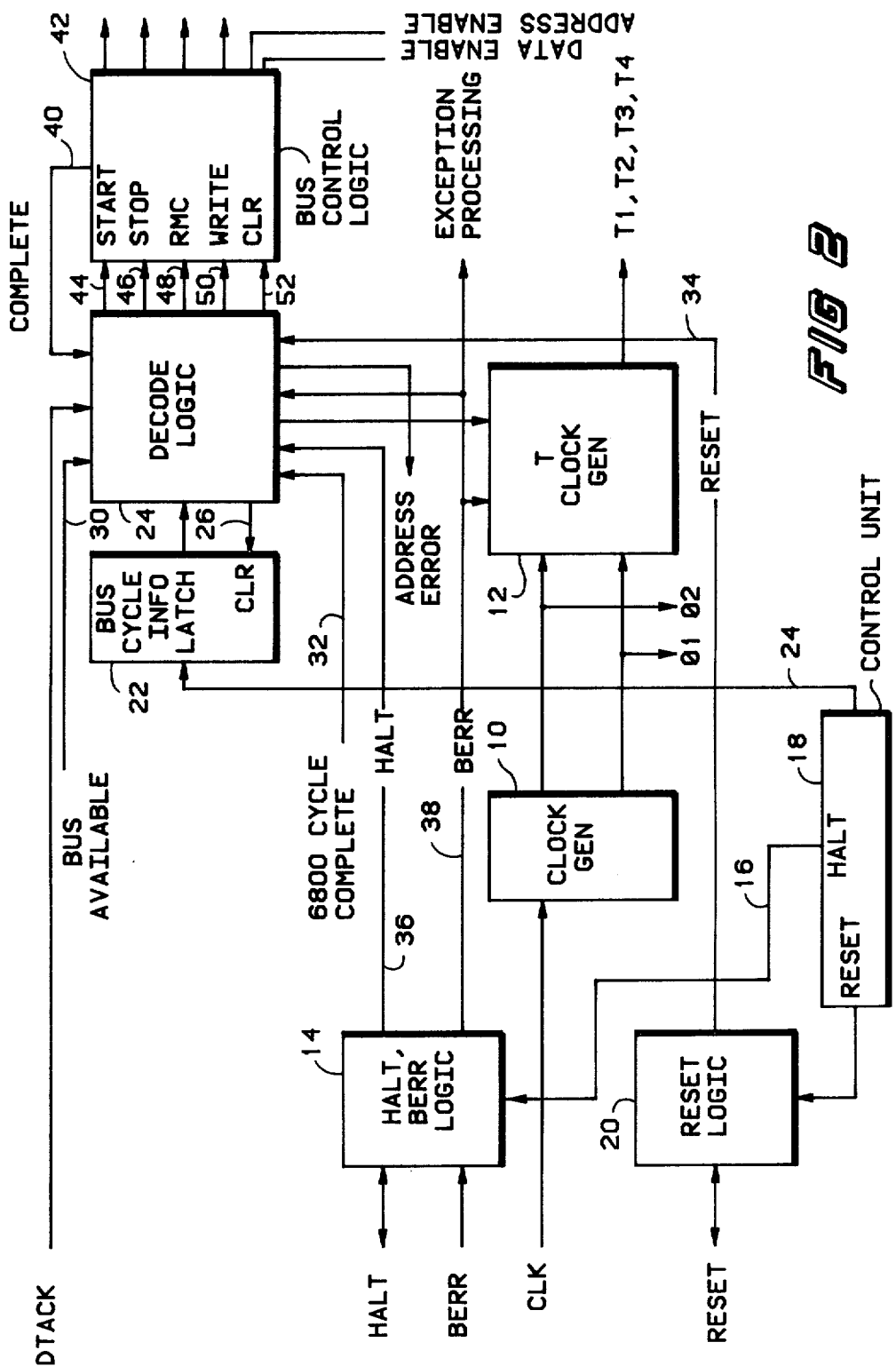

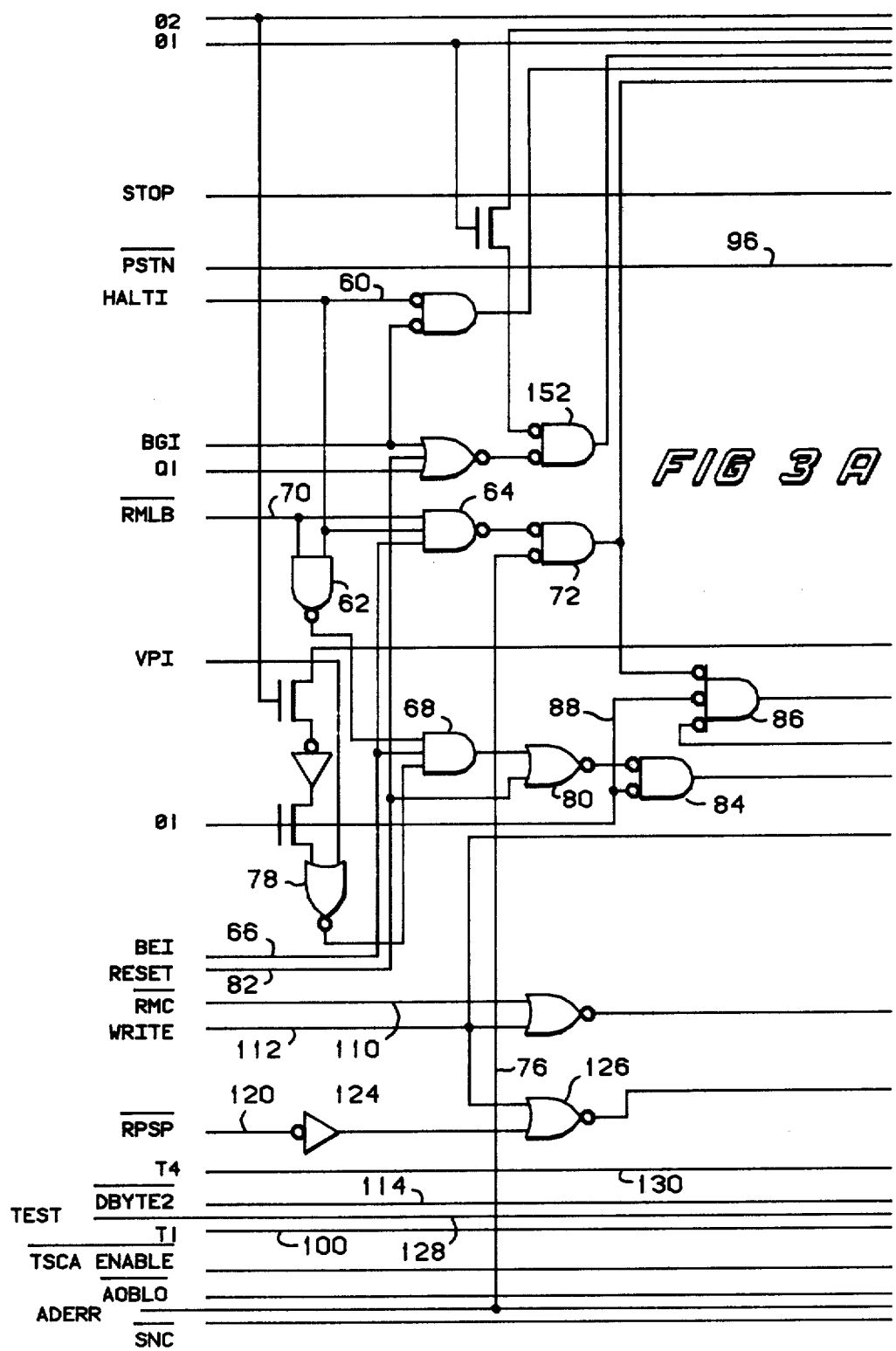

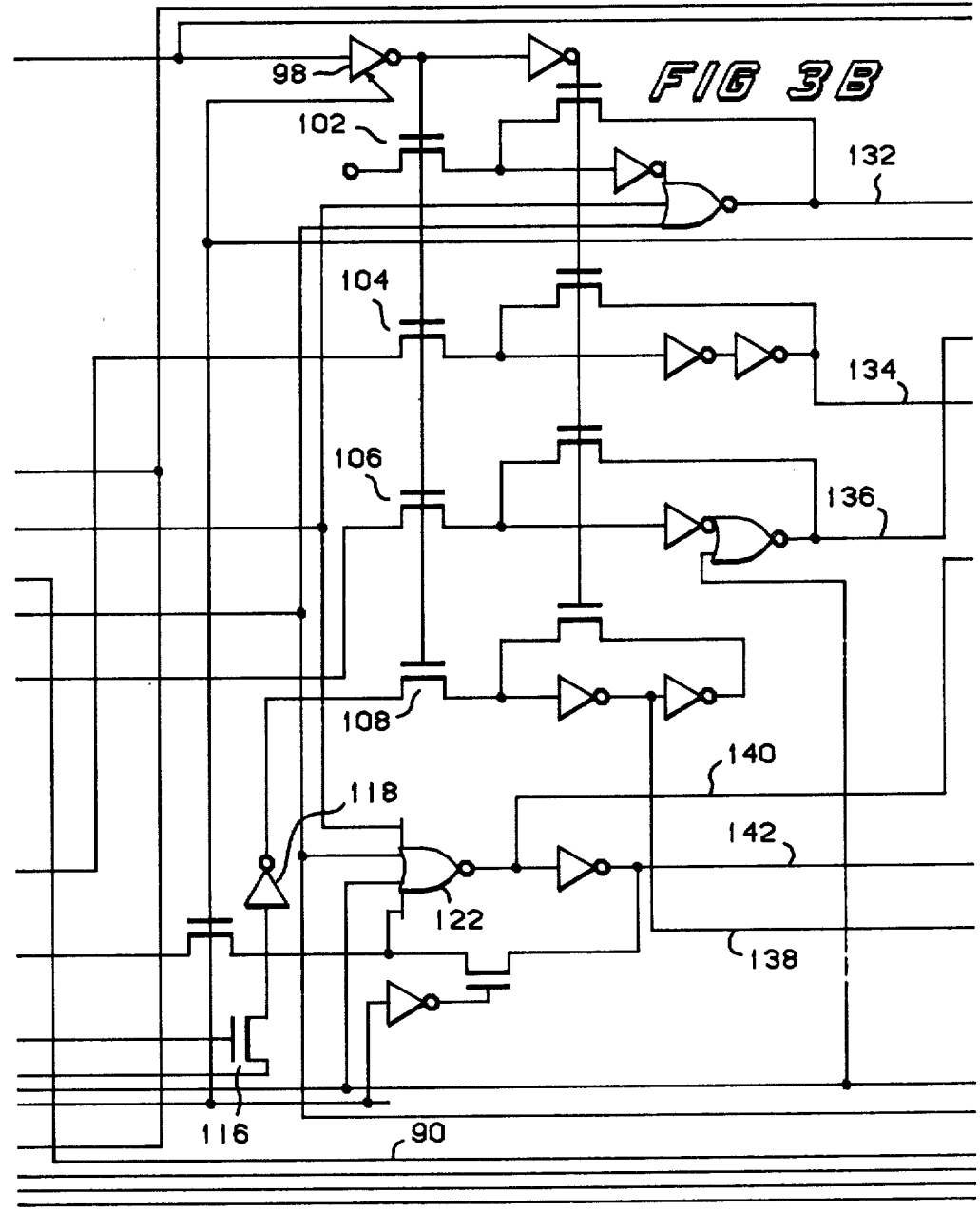

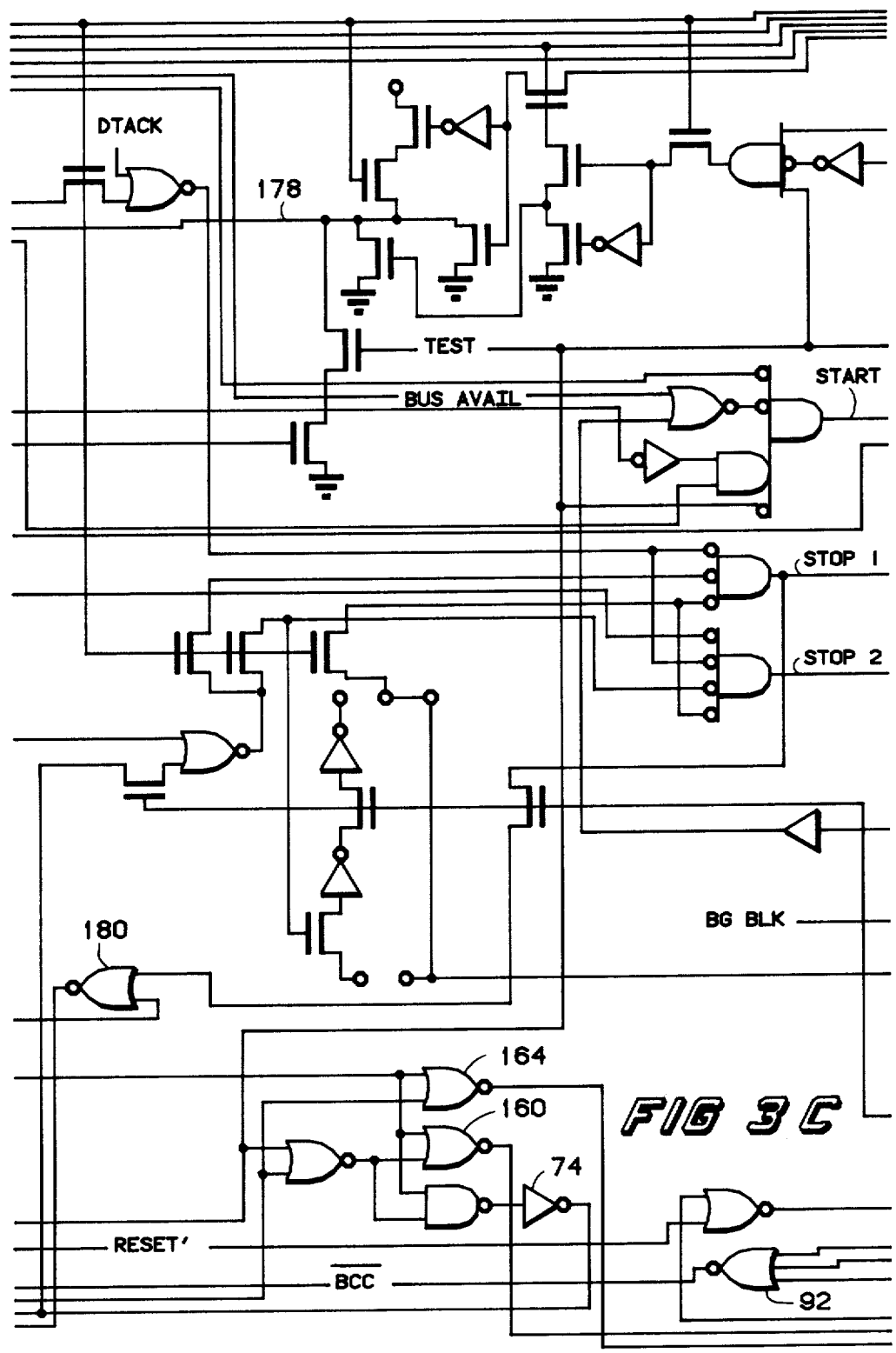

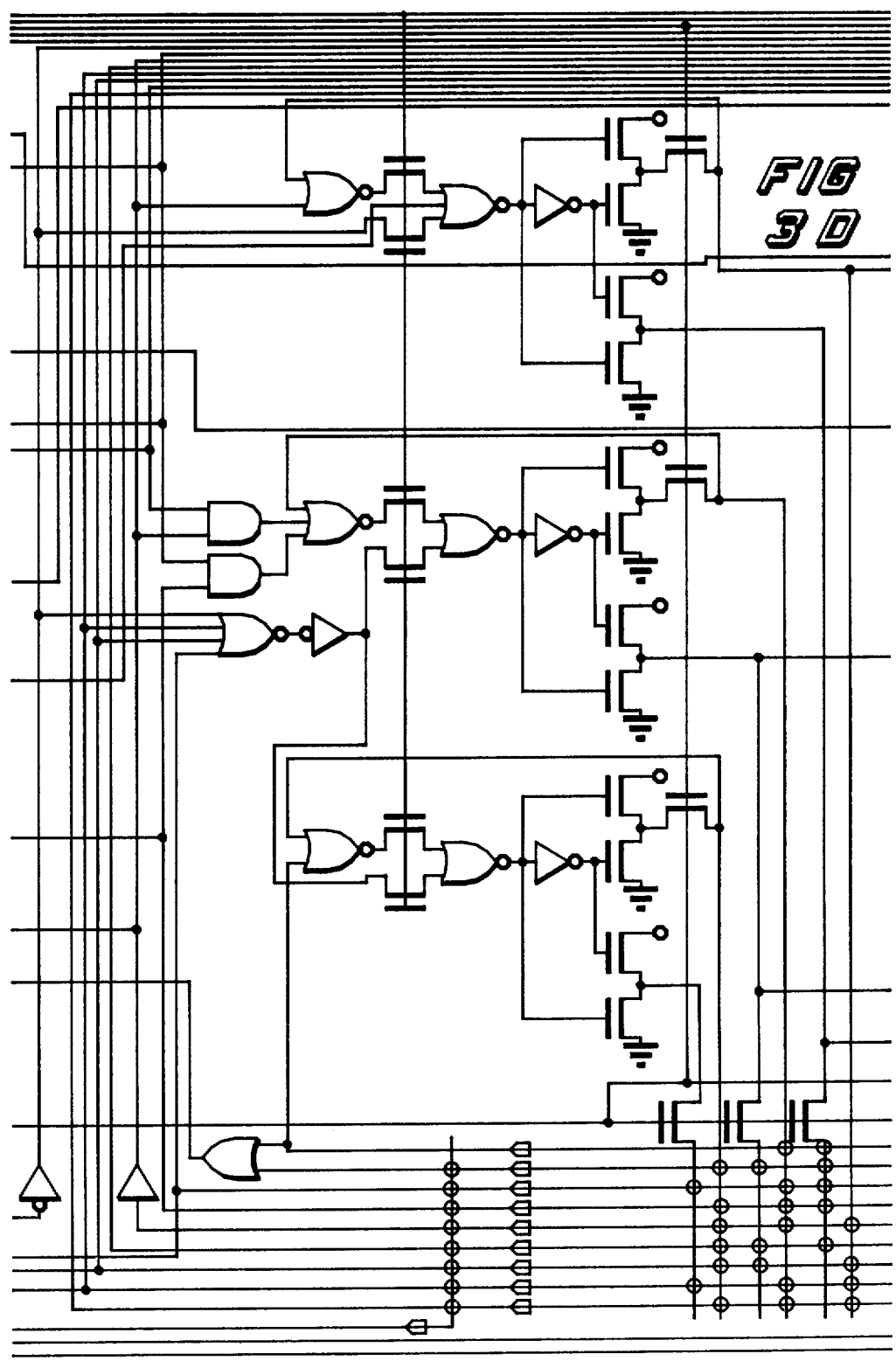

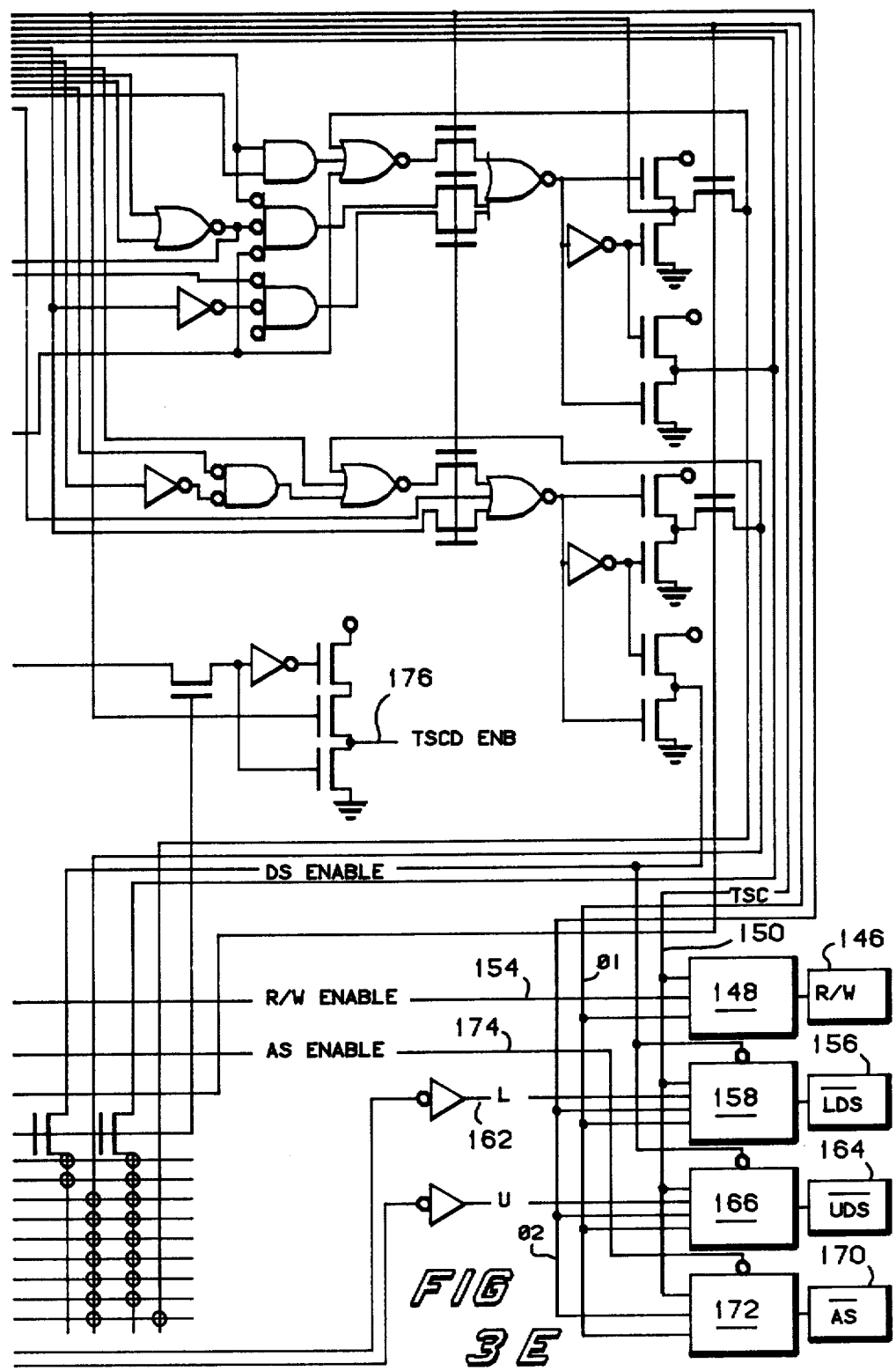

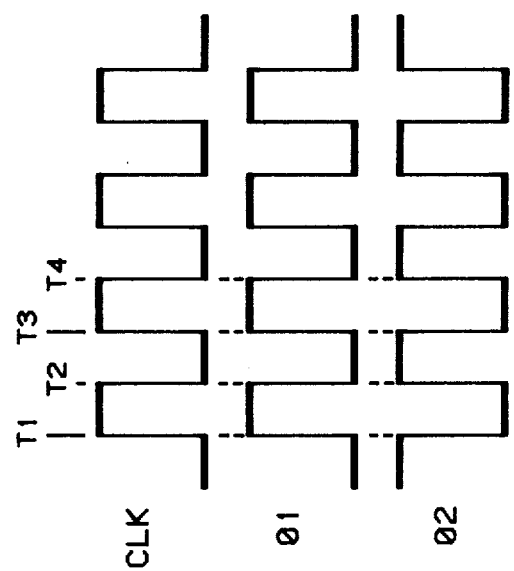

BUS ERROR RECOGNITION FOR MICROPROGRAMMED DATA PROCESSOR

CROSS REFERENCE TO RELATED APPLICATIONS

1. "Microprogrammed Control Apparatus for Data Processor" invented by Tredennick et al., bearing Ser. No. 961,796, filed Nov. 17, 1978, now U.S. Pat. No. 4,307,445 and assigned to the assignee of the present invention.

2. "Execution Unit for Data Processor Using Segmented Bus Structure" invented by Gunter et al., bearing Ser. No. 961,798, filed Nov. 17, 1978 and assigned to the assignee of the present invention, now U.S. Pat. No. 4,296,469.

3. "Two Level Control Store for Microprogrammed Data Processor" invented by Gunter et al., bearing Ser. No. 041,135, filed May 21, 1979, and assigned to the assignee of the present invention.

4. "Conditional Branch Unit for Microprogrammed Data Processor" invented by Tredennick et al., bearing Ser. No. 041,201, filed May 21, 1979, and assigned to the assignee of the present invention.

5. "ALU and Condition Code Control Unit for Data Processor" invented by Hobbs et al., bearing Ser. No. 041,203, filed May 21, 1979, and assigned to the assignee of the present invention.

6. "Instruction Register Sequence Decoder for Microprogrammed Data Processor" invented by Tredennick et al., bearing Ser. No. 041,202, filed May 21, 1979, and assigned to the assignee of the present invention.

7. "Microprocessor Interrupt Processing" invented by Gunter et al., bearing Ser. No. 136,593 filed of even date herewith and assigned to the assignee of the present invention.

BACKGROUND OF THE INVENTION

1. Background of the Invention

This invention relates generally to data processors, and, more particularly, to a microprocessor wherein a bus cycle may be retried upon detection of a bus error.

2. Description of the Prior Art

Recent improvements in MOS semiconductor technology have resulted in advances in large scale integrated circuit microprocessors. The latest generation of LSI microprocessors is an order of magnitude more powerful than the previous generation introduced three or four years ago. The latest generation of microprocessors have 16 bit data paths and 16 bit arithmetic capability, and they directly address multiple-megabyte memories. In terms of functional capability and speed, they will out perform all but the high-end models of current 16 bit minicomputers.

LSI microprocessor design is now at a stage where better implementation techniques are required in order to control complexity and meet tight design schedules. One technique for achieving these goals is to use microprogramming for controlling the processing. Some of the traditionally claimed benefits of microprogramming are, for example, regularity (to decrease complexity), flexibility (to ease design changes), and reduced design costs.

It is well known to provide a data processing system which includes a software capability for processing bus transfer errors. However, such software capabilities are both complex and expensive and, as such, are not suitable for microprocessor applications. Furthermore, for simple problems such as parity errors on transfers, the software approach to correcting bus errors is prohibitive in terms of the amount of time required before the processor can retry the cycle.

SUMMARY OF THE INVENTION

It is an object of the present invention to provide an improved microprocessor which utilizes a hardware oriented bus cycle retry capability.

It is a further object of the present invention to provide an improved microprocessor wherein the period between the point at which the microprocessor goes off the bus and responds to a bus error and the point at which the cycle is retried can be varied.

It is a still further object of the invention to provide a method for retrying a bus cycle in a microprocessor when the user determines that a bus error has occurred and requests a retry.

Finally, it is an object of the present invention to provide an improved microprocessor which employs both software oriented error handling capabilities and hardware oriented retry capabilities.

According to a broad aspect of the invention there is provided an integrated circuit microprocessor for executing operations in the form of bus cycles upon digital information in response to a plurality of instruction programs, said microprocessor including a control unit for generating signals indicative of how a bus cycle is to be run, comprising: first means for receiving a bus error signal from circuitry external to the data processor, said error signal indicating that a transfer error has occurred during a bus cycle; second means for receiving a halt signal from the external circuitry indicating that the bus cycle associated with said error signal should be rerun; and third means coupled to said first and second means and to said control unit for rerunning said bus cycle when said halt signal terminates.

According to a further aspect of the invention there is provided an integrated circuit microprocessor for executing operations in the form of bus cycles upon digital information in response to a plurality of instruction programs, comprising: a control unit for generating control signals indicative of how a bus cycle is to be run; first means coupled to said control unit for storing said control signals; second means coupled to said first means for receiving a bus error signal from circuitry external to said microprocessor; third means coupled to said first means and responsive to said bus error signal for resetting said first means; fourth means for receiving a halt signal from the external circuitry indicating that the bus cycle should be rerun; fifth means coupled to said third and fourth means for disabling said third means during said halt signal; and sixth means coupled to said first and fourth means and to said control unit for rerunning the bus cycle upon termination of said halt signal.

According to a still further aspect of the invention there is provided an integrated circuit microprocessor for executing operations in the form of bus cycles upon digital information, said microprocessor including a control unit for generating signals indicative of how a bus cycle is to be run, comprising: first means for receiving a first signal from circuitry external to the data processor, said first error signal indicating that an error has occurred during a bus cycle; second means for receiving a second signal from the external circuitry indicating that the bus cycle associated with said first signal should be rerun; and third means coupled to said first and second means and to said control unit for inhibiting the running of another bus cycle until said second signal terminates.

The above and other objects, features and advantages of the present invention will be more clearly understood from the following detailed description taken in conjunction with the accompanying drawings, in which:

BRIEF DESCRIPTION OF THE DRAWINGS

FIG. 2 is a block diagram of the apparatus which performs a bus cycle retry upon detection of a bus error and request from the user;

FIGS. 3A-3E are logic diagrams of one implementation of the bus error retry apparatus shown in FIG. 2;

FIG. 4 illustrates the proper orientation of FIGS. 3A-3E;

FIG. 5A is a timing diagram illustrating the relationship of an externally supplied clock signal and the internally generated clock and control signals ($\phi 1$, $\phi 2$, T1, T2, T3, T4)

DESCRIPTION OF THE PREFERRED EMBODIMENT

Figure 1:
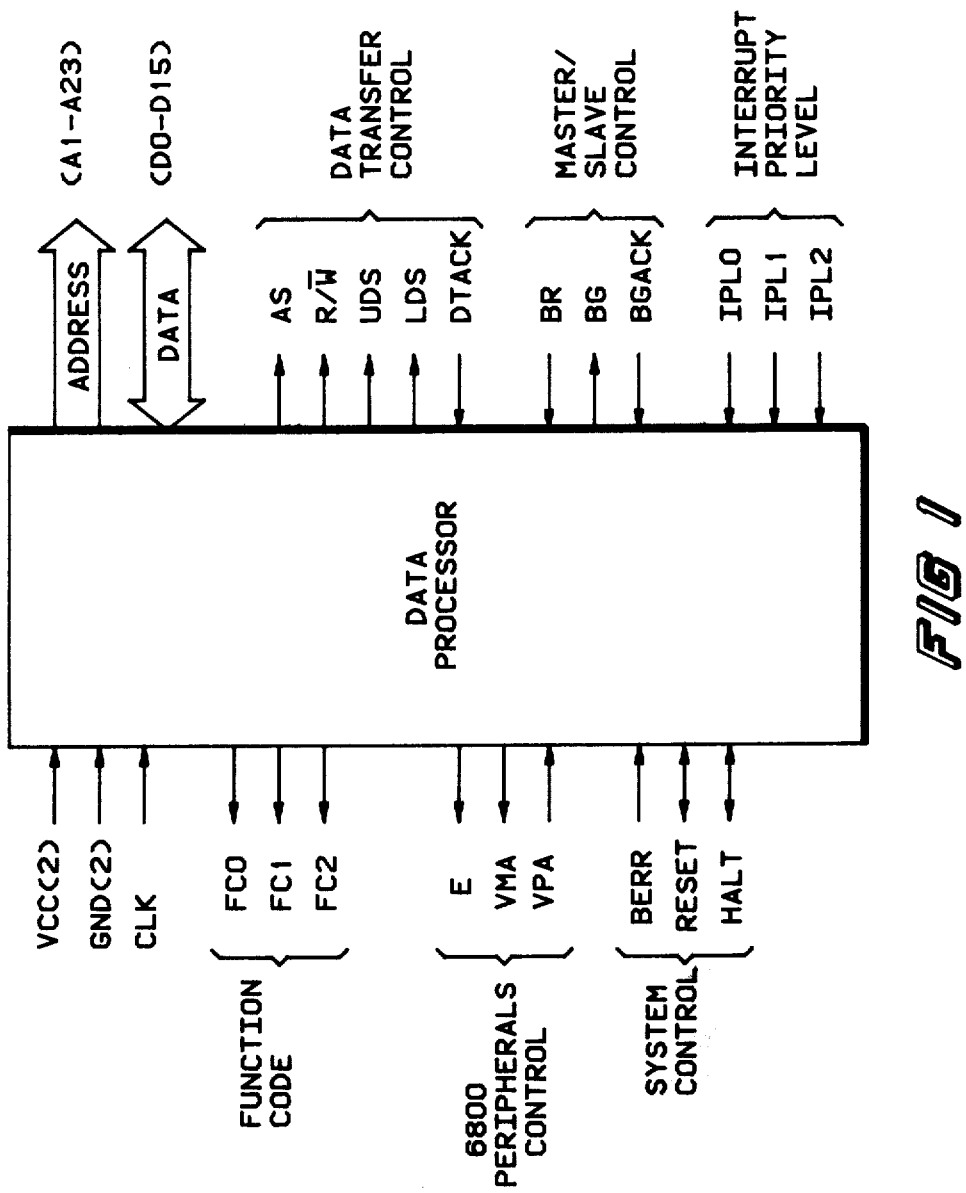
FIG. 1 is a block diagram of a microprocessing system according to the present invention illustrating the input.

FIG. 1 is a block diagram of a data processor according to the preferred embodiment of the present invention and illustrates the input output signals employed by the data processor for communication with external circuitry. Address leads A1-A23 provide a 23 bit output address which, in combination with other bits, enable the data processor to address 16,777,216 bytes of address space. Data leads D0-D15 provide a bidirectional 16 bit data path between the data processor and the external circuitry.

In FIG. 1, a first group of control leads has been labeled DATA TRANSFER CONTROL. Control lead AS provides an address strobe output which indicates that a valid address is on the address bus (A1-A23) and also indicates that external circuitry should not attempt to place a different address on the address bus at this time. Control lead R/W is an output which indicates to the external circuitry whether the current data transfer is a read or a write operation. During a read operation, the data processor receives data from external circuitry. During a write operation, the data processor transmits data to external circuitry. Control leads UDS and LDS are data strobe output signals which indicate to the external circuitry whether a byte or a word data transfer is to occur. When LDS is enabled, the least significant byte (8 bits) of the data bus D0-D7 is involved in the data transfer. Similarly, when UDS is enabled, the most significant byte of the data bus D8-D15 is involved in the data transfer. A word type data transfer will result if both UDS and LDS are enabled. Control lead DTACK is an input terminal which receives a signal from the external circuitry indicating to the data processor that the external circuitry acknowledges the data transfer operation initiated by the data processor, thereby allowing for asynchronous data transfers between the data processor and the external circuitry.

Another group of control leads shown in FIG. 1 is labeled MASTER/SLAVE CONTROL. This group of control leads is used in the event that circuitry external to the data processor is to take control of the system bus. Control lead BR is an input terminal which receives a bus request signal from the external circuitry. Control lead BG is an output signal which provides a bus grant signal to the external circuitry which indicates that the data processor will allow control of the system bus to be transferred to the external circuitry. Finally, control lead BGACK is an input terminal which receives a bus grant acknowledge signal from the external circuitry for acknowledging that control over the system bus will be assumed by the external circuitry.

Another group of control leads in FIG. 1 is labeled interrupt priority level. Three control leads (IPL0, IPL1 and IPL2) are each input terminals which receive the three bit interrupt signal from external circuitry for indicating to the data processor that an external peripheral device is requesting an interrupt. The interrupt priority level signals also indicate the relative priority of the interrupt request.

The data processor shown in FIG. 1 includes power supply terminals for coupling the data processor to a supply voltage (VCC) and for coupling the data processor to ground potential (GND). The data processor also includes an input terminal for receiving a clock signal (CLK) which synchronizes operations within the data processor.

Another group of control leads in FIG. 1 has been labeled FUNCTION CODE. These three terminals (FC0, FC1 and FC2) provide external circuitry with information regarding the function of the current bus cycle. For example, these three output signals can distinguish between a data transfer involving an instruction program space and a data space within the overall address space. Also, these signals can distinguish between a data transfer occurring during normal execution and a data transfer occurring during an interrupt acknowledge cycle.

Another group of control leads shown in FIG. 1 have been labeled 6800 PERIPHERALS CONTROL. The function of these control leads is to permit data transfers between the data processor and peripheral devices of the type within the M6800 family of microprocessor circuits generally available from Motorola, Inc. Output lead E provides an enable clock signal which is required by the M6800 type peripheral device. Control lead VMA provides a valid memory address output signal for indicating to M6800 type peripheral devices that a valid memory address is on the address bus. Control lead VPA receives a valid peripheral address signal from external circuitry confirming that an M6800 compatible address space has been addressed by the data processor.

Finally, another group of control leads in FIG. 1 has been labeled SYSTEM CONTROL. Control lead BERR receives a signal from external circuitry indicating that a problem has occurred during the bus cycle currently being executed. For example, a bus error occurs when the data processor initiates a data transfer operation by asserting control signal AS and none of the external devices acknowledges the data transfer (i.e. DTACK is not asserted after an alloted amount of time). Also, a bus error occurs when the data processor initiates an interrupt acknowledge cycle and none of the peripheral devices responds within an allotted period of time. An attempted access by the data processor of a portion of the address space which a particular user is restricted from accessing will also result in a bus error.

Control lead RESET is a bidirectional terminal which has two basic modes of operation. In an input mode, receipt of a reset signal will cause the data processor to execute an initiation sequence located in a predetermined area of the address space. This mode of reset operation may occur upon initial application of the power supply to the data processor or subsequently by an externally generated reset signal. In the output mode, the data processor can generate a reset signal as an output signal for initializing external circuitry in response to the execution of a software reset instruction. Finally, control lead HALT is a bidirectional terminal which has input and output modes of operation. In the input mode of operation, the presence of the HALT signal stops the data processor after completion of the current bus cycle. Proper manipulation of the HALT signal can allow for single bus cycle operation. With the exception of the MASTER/SLAVE CONTROL signals, all of the data processor output terminals assume a passive mode and all control signals are inactive during the HALT mode of operation. During an output mode of operation, the data processor itself can force the HALT terminal to a low logic level in certain circumstances. For example, the data processor will force the HALT terminal to a low level if, in response to a first bus error, a second bus error is generated when the data processor attempts to store processed or status information in an address space known as a stack. If a bus error occurs on the first stacking operation, there have been two bus errors in a row or a double bus fault. When a double bus fault occurs the processor will halt.

Figure 5B:
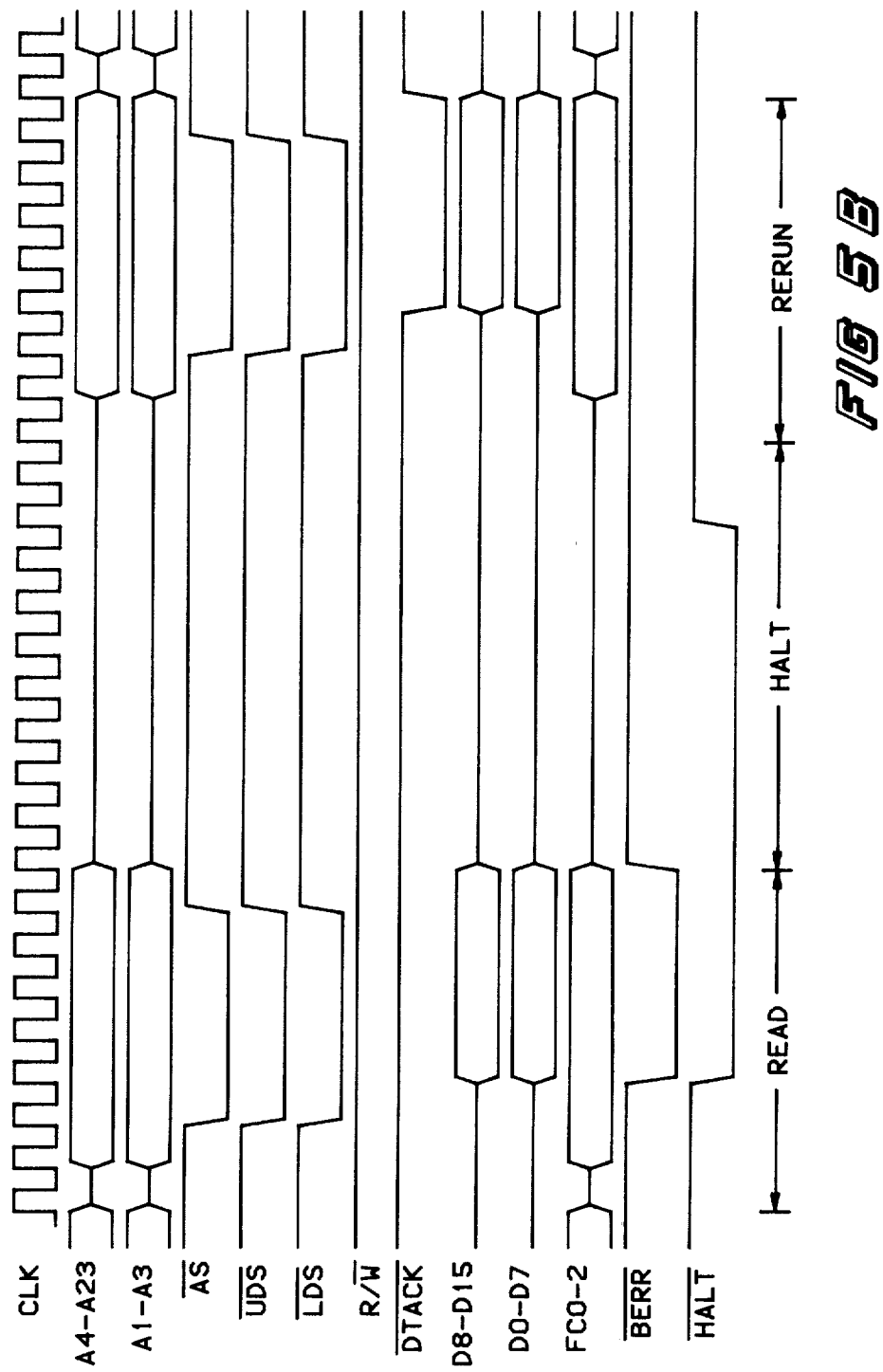
FIG. 5B illustrates the bus error/halt timing.

FIG. 2 is a block diagram which illustrates, in abbreviated form, the apparatus for removing the microprocessor from the bus and initiating a retry cycle in response to the receipt of a bus error signal (BERR) and a HALT signal from the external circuitry. To begin with, the external clock signal (CLK) is applied to clock generator 10 which in turn generates $\phi 1$ and $\phi 2$ clock signals which are 180° out of phase. These clock signals are used throughout the remainder of the system and are also applied to T clock generator 12 which generates additional timing and control signals T1, T2, T3 and T4. The relationship of the $\phi 1$ and $\phi 2$ clock signals and the T clock signals are shown in FIG. 5A and the overall bus error/halt timing is shown in FIG. 5B.

HALT, BERR LOGIC 14 receives the HALT and BERR signals from external circuitry and receives, in the output mode, a halt signal over line 16 which is generated by CONTROL UNIT 18. The CONTROL UNIT 18 is more fully described in copending U.S. patent application Ser. No. 041,135 entitled "Two-Level Control Store for Microprogrammed Data Processor", filed May 21, 1979, assigned to the assignee of the present invention, and incorporated herein by reference.

A RESET LOGIC unit 20 receives, in the input mode, the RESET signal from the external circuitry as described above and, in an output mode, a reset signal is generated by CONTROL UNIT 18 and applied to RESET LOGIC 20.

In addition to supplying reset and halt signals in the output mode, control unit 18 supplies information to the BUS CYCLE INFO LATCH 22 over conductors 24 which relates to how the cycle is to be run. Included in the information which is transmitted over conductors 24 is bit 0 from the address output buffer (AOBLO) which is located in the execution unit. This bit is used to determine if an upper and/or lower data strobe is to be generated and if an address error has occurred. Also included is a signal which indicates that the operation is a byte operation (DBYTE2), that the cycle is or is not a read-modify-write cycle ($\overline{RMC}$) and that the cycle is or is not a write cycle (WRITE). Furthermore, signals are provided which represent permission to start and permission to stop a bus cycle. These signals are $\overline{PSTN}$ and $\overline{RPSP}$.

Information from CONTROL UNIT 18 is latched in bus CYCLE INFO LATCH 22 and, during normal operation, the latch is cleared at the end of the bus cycle by a clear signal from DECODE LOGIC 24 over line 26.

Decode logic 24 not only has access to the information stored in bus cycle info latch 22, but also receives the above described DTACK signal over line 28, a signal indicative of bus availability over line 30, a signal indicative of the completion of an M6800 cycle over line 32, a reset signal generated by RESET LOGIC 20 over line 34 and the internal versions of the HALT and BERR signals generated by HALT, BERR LOGIC 14 over lines 36 and 38 respectively. Additionally, decode logic 24 receives a signal over line 40 from BUS CONTROL LOGIC 42 indicating that the bus cycle has been completed.

The bus error signal from HALT, BERR LOGIC 14 is applied to T clock generator 12. Additionally, a clock enable signal generated by decode logic 24 is applied to T clock generator 12 to disable the clocks.

There are five basic outputs from decode logic 24 which are applied to bus control logic 42. First, a start signal is generated by the decode logic and applied to the bus control logic over line 44. This signal informs the bus control logic that it should start a bus cycle. Start is generated by decode logic 24 whenever a PSTN (permission to start) is sent from control unit 18 and latched in bus cycle info latch 22 provided that the bus is available and is not trying to do a restart cycle. A stop signal is applied to bus control logic 42 from decode logic 24 over line 46 and informs the bus control logic that it should terminate the current cycle. Stop is generated whenever an RPSP (permission to stop) is sent from control unit 18 and latched in bus cycle info latch 22 and a bus transfer acknowledge is received (the receipt of a DTACK signal, an address error or an M6800 cycle complete signal.) An RMC signal is applied over line 48 which informs the bus control logic that the next cycle is to be a read-modify-write cycle. The write signal applied over line 50 informs the bus control logic that the next cycle is to be a write cycle. Finally, a CLR signal on line 52 informs the bus control logic that it should go immediately to the reset state. This occurs during chip reset and a detection of certain error conditions, one of which is the subject of the present invention.

Bus cycle information latch 22 includes five latches for storing information supplied by the control unit over lines 24 to insure its availability when the bus becomes available. The first of these latches is employed to indicate that a memory cycle is pending. Second, third and fourth latches indicate that the cycle should be terminated, that the next cycle is a write cycle, and that the next cycle is a read-modify-write cycle, respectively. Finally, the fifth latch is used to store the occurrence of DBYTE which is subsequently used in calculating address error and determining which data strobe is to be enabled. All of these latches are loaded at the first occurrence of T1 after PSTN goes active, with the exception of STOP which requires only a T1 to load. Bus control logic 42 generates the above described output signals R/W, AS, UDS, LDS, address enable and data enable.

Under normal conditions, the bus control logic behaves like a normal state machine, sequencing through a defined set of states. During T4 prior to running a bus cycle, control unit 18 sends a PSTN signal to the bus cycle info latch 22. If the bus is available, the bus control logic will start a cycle. If the bus is not available, the PSTN signal is latched in bus cycle info latch 22 and saved until the bus becomes available. The rest of the information, RMC, WRITE, etc., is latched on the first T1 after PSTN is activated. When the bus becomes available, the bus control logic will start a bus cycle on the first $\phi 1$. A bus available signal is generated as will be described below and is active as long as no HALT, BRI, BGI or BGACK signal is present. The bus control logic will not terminate the cycle until a data transfer signal (i.e. DTACK) and a RPSP (permission to stop) signal is received from control unit 18.

There are several conditions which will cause the bus control logic to abort its normal operation and terminate bus cycles. The first occurs when a bus error signal is received (BERR) in the absence of an RMC cycle or 6800 cycle. In this case, the bus control logic is reset during the next two clocks starting with the next $\phi 2$ clock pulse. This reset is an orderly shutdown with the address strobe going inactive during a $\phi 1$ clock signal and the address enable going inactive on the next $\phi 1$ clock signal. This occurs only in the absence of a HALT signal which, if present, would cause the generation of a restart (RSRT) signal rather than a bus error reset.

A bus error which occurs during a read-modify-write cycle is handled in essentially the same way, however, a restart is prohibited during an RMC cycle. The bus error signal will in any event terminate the cycle and force a bus error trap.

A bus error during an M6800 cycle terminates normally and then takes an error trap.

An address error terminates the cycle somewhat differently as a result of the way the address error signal is generated. A DBYTE latch is used in conjunction with the AOBLO signal to generate an address error. The address error signal is active from the first T1 of the error cycle to the first T1 of the next memory reference cycle. An address error does not reset the bus control logic; instead, it leads it to believe that both a data transfer is complete (i.e. DTACK) and a permission to stop has been received from the control unit.

The bus control logic also contains an illegal state decoder and apparatus for use in a test mode of operation. In a test mode, the bus control logic terminates the cycle and inhibits the start input to the logic. It also causes the bus control logic to enable the address buffers and disable the data buffers.

While the above description of bus error operation is given in general terms, it is the restart or retry operation which is the subject of the present invention and which will be emphasized hereinafter. This occurs when a bus error is detected (BERR) and the peripheral also supplies a HALT signal to HALT BERR logic 14. In the absence of a HALT signal, the BERR signal causes abnormal termination of the bus cycle; normal termination resulting from the occurrence of a DTACK signal. In the absence of a HALT signal, BERR causes the information contained in BUS CYCLE INFO LATCH to be cleared and the bus cycle to terminate. BERR is also applied to exception priority logic which initiates software trapping. It is then processed in much the same way as interrupts are processed as described in copending application Ser. No. 136,593, entitled "Microprocessor Interrupt Processing" filed of even date herewith and assigned to the assignee of the present invention. If, however, both BERR and HALT are generated by the peripheral, the information which has been stored in BUS CYCLE INFO LATCH 22 is not cleared. It remains latched and awaits the termination of the HALT signal in order that the cycle may be retried.

FIGS. 3A-3E are diagrams illustrating one logic implementation of the system shown in the block diagram of FIG. 2. FIG. 4 illustrates the proper orientation of FIGS. 3A-3E. Referring to FIG. 3A, the internal version of HALT (HALTI) is applied via conductor 60 to a first input of NAND gate 62 and to a first input of NAND gate 64. The bus error signal (referred to in FIG. 3A as BEI) is applied over conductor 66 to a second input of NAND gate 64 and to a first input of AND gate 68. The third input of NAND gate 64 and the second input of NAND gate 62 is coupled via conductor 70 to a signal shown as $\overline{\text{RMLB}}$. The RMLB signal, when high, indicates a read-modify-write cycle.

The output of NAND gate 64 is applied to a first input of gate 72. The second input of gate 72 is coupled via conductor 74 to a signal ADERR which is generated at the output of inverter 74 and applied to gate 72 over conductor 76. Thus, if HALTI and BEI are active, and the $\overline{\text{RMLB}}$ signal is high indicating that the cycle is not a read-modify-write cycle, then gate 64 will allow gate 72 to generate a restart or retry as long as no address error is present. The presence of an address error (ADERR) will disable retry gate 72. The output of NAND gate 62 is applied to a second input of AND gate 68, and the output of NOR gate 78 is applied to the third gate of AND input 68. When the output of NOR gate 78 goes high, this indicates that a 6800 cycle is underway and thus prevents a bus error reset during a cycle. The output of gate 78 also assures that a bus error reset does not occur when a bus cycle is not running. NOR gate 80 has a first input coupled to the output of AND gate 68 and a second input coupled to the external reset signal described over line 82. The output of gate 80 represents a reset signal which is the bus error reset/external reset to both BUS CYCLE INFO LATCH 22 and BUS CONTROL LOGIC 42 shown in FIG. 2. The actual reset signal appears at the output of gate 84 and is gated by clock signal $\phi 1$ which is supplied to its second input.

As stated previously, the output of restart or retry gate 72 is applied to a first input of clear gate 86. A second input of clear gate 86 is coupled to clock signal $\phi 1$ over line 88 and the third input of clear gate 86 is coupled, via line 90 to the output of NOR gate 92 in the bus control logic shown in FIG. 3D. This signal ($\overline{\text{BCC}}$) indicates that a bus cycle has been completed and corresponds to the signal from bus control logic 42 to decode logic 24 over line 40 and labeled "complete" in FIG. 2. Thus, at time $\phi 1$, if the bus cycle is complete, a bus error is present and a HALT condition is not present, the output of clear gate 86 will go high. This signal is applied to the bus cycle information latch logic shown in FIG. 3B via conductor 94 and corresponds to the signal transmitted from decode logic 24 to bus cycle information latch 22 via conductor 26 in FIG. 2.

If, on the other hand, both bus error (BEI) and HALT are present, the output of gate 86 will fall to a low logic level and thus the information contained in the bus cycle information latch will not be cleared and will be available for use when the HALT signal terminates.

FIG. 3B illustrates some of the logic circuitry included in the bus cycle information latch 22 (FIG. 2). As can be seen, a permission to start signal $\overline{\text{PSTN}}$ signal is applied from control unit via line 96 to the input of gate 98. This gate is triggered by a timing signal T1 which is applied to gate 98 via line 100. The output of gate 98 causes field effect transistors 102, 104, 106 and 108 to be turned on in order to enable the logic to store appropriate signals from the control unit. These signals are $\overline{\text{RMC}}$ (read-modify cycle) applied over conductor 110 to field effect transistor 104, WRITE applied over conductor 112 to field effect transistor 106, $\overline{\text{DBYTE2}}$ applied over conductor 114 to field effect transistor 108 via field effect transistor 116 and inverter 118 and $\overline{\text{RPSP}}$ (permission to stop) applied over conductor 120 to a first input of NOR gate 122 via inverter 124 and NOR gate 126. The second input of NOR gate 126 is coupled to the WRITE signal on conductor 112. A second input of gate 122 is coupled to a test input via line 128, and third and fourth inputs of gate 122 are coupled to the reset and clear outputs of gates 84 and 86 respectively shown in FIG. 3A.

As stated previously, the output of gates 84 and 86 will generate clear signals if a bus error has been detected and there is no HALT signal. However, reset gate 84 will also generate a clear signal upon the occurrence of an external reset signal.

The BUS CYCLE INFO LATCH shown in FIG. 3B generates a memory cycle pending (MCP) signal on conductor 132, a read-modify-write cycle signal (RMC) on conductor 134, a WRITEL signal on conductor 136, a DBYTE signal on conductor 138, STOP and $\overline{\text{STOP}}$ signals on conductors 140 and 142 respectively. These signals are applied to the bus control logic shown in FIGS. 3C, 3D and 3E. A detailed description of this logic is not deemed pertinent to the invention and will only impede an understanding thereof; however, it is important to note that the output signals of bus control logic 42 shown in FIG. 2 are in fact generated by the bus control logic shown in FIGS. 3C, 3D and 3E. For example, the signal R/W appears at pad 146. Buffer 148 receives as inputs a three-state control signal over conductor 150 which is generated by gate 152 in FIG. 3A. Buffer 148 also receives clock signal $\phi$1 and R/W enable signal generated in the bus control logic over line 154.

$\overline{\text{LDS}}$ is produced at pad 156 which is coupled to the output of buffer 158. This buffer receives both the $\phi$1 and $\phi$2 clock signals and the three-state control signal. In addition, this buffer receives an L signal which is generated by the logic shown in FIG. 3C (gate 160) over line 162. Similarly, the $\overline{\text{UDS}}$ pad 164 is coupled to the output of buffer 166 which receives, in addition to the $\phi$1, $\phi$2 and three-state control signals, a U signal which is generated by gate 168 in FIG. 3C. The address strobe ($\overline{\text{AS}}$) signal is produced at pad 170 via buffer 172 which in addition to receiving the $\phi$1, $\phi$2 and three-state control signals also receives an AS enable signal over line 174 which is generated in the bus control logic shown in FIG. 3C. Finally, the data enable signal corresponds to the TSCD signal generated on line 176 in FIG. 3E and the address enable signal (TSCA) shown in FIG. 2 is generated at conductor 178 in FIG. 3C.

Finally, for the sake of completeness, the $\overline{\text{SNC}}$ signal corresponds to the clock enable signal to the T clock generator and is generated at the output of 180.

The above description is given by way of example only. Changes in form and details may be made by one skilled in the art without departing from the scope of the invention as defined by the appended claims.

We claim:

1. A microprocessor for communicating with equipment peripheral thereto over a bus during a bus cycle, said microprocessor comprising:

a control unit for generating bus logic control signals indicative of how said bus cycle is to be run;

latch means coupled to said control unit for latching said bus logic control signals;

bus control logic means coupled to said latch means and to said bus, for running said bus cycle, including generating bus control signals via said bus for controlling the use of said bus by said peripheral equipment, in response to said latched bus logic control signals; and bus error logic means coupled to said bus and to said bus control logic means, said bus error logic means including first means for receiving a first signal from said peripheral equipment indicating that an error has occurred during said bus cycle; second means for receiving a second signal from said peripheral equipment indicating that said bus cycle should be rerun; and third means for forcing said bus control logic means to rerun said bus cycle using said latched bus logic control signals, including generating said bus control signals via said bus for controlling the use of said bus by said peripheral equipment, only in response to said first and said second signals being simultaneously received by said first and second means;

whereby said bus cycle will not be rerun if said peripheral equipment provides only said first or second signal.

2. A microprocessor according to claim 1 wherein said bus error logic means include fourth means for forcing said bus control logic means to initiate the rerunning of said bus cycle using said latched bus logic control signals when said second signal terminates.

3. A microprocessor for communicating with equipment peripheral thereto over a bus during a bus cycle, said microprocessor comprising:

a control unit for generating bus logic control signals indicative of how a bus cycle is to be run first means for receiving a bus error signal from said peripheral equipment indicating that a transfer error has occurred during said bus cycle;

second means for receiving a halt signal from said peripheral equipment indicating that the bus cycle associated with said error signal should be rerun;

third means coupled to said first and second means and to said control unit, for forcing a bus control logic means to rerun said bus cycle when said halt signal terminates, said third means comprising:

storage means for storing said bus logic control signals;

fourth means for resetting said storage means to a predetermined state in response to said error signal; and fifth means for disabling said fourth means when said halt signal is present so as to prevent resetting said storage means in response to said error signal;

said bus control logic means coupled to said third means and to said bus, for running said bus cycle, including generating bus control signals via said bus for controlling the use of said bus by said peripheral equipment, in response to said stored bus logic control signals.

4. An integrated circuit according to claim 3 wherein said storage means includes a plurality of latches.

* * * * *